J. P. CLEAL & A. MACAULEY.
CASH REGISTER.
APPLICATION FILED NOV. 18, 1901.
920,110.
Patented May 4, 1909.
9 SHEETS—SHEET 4.
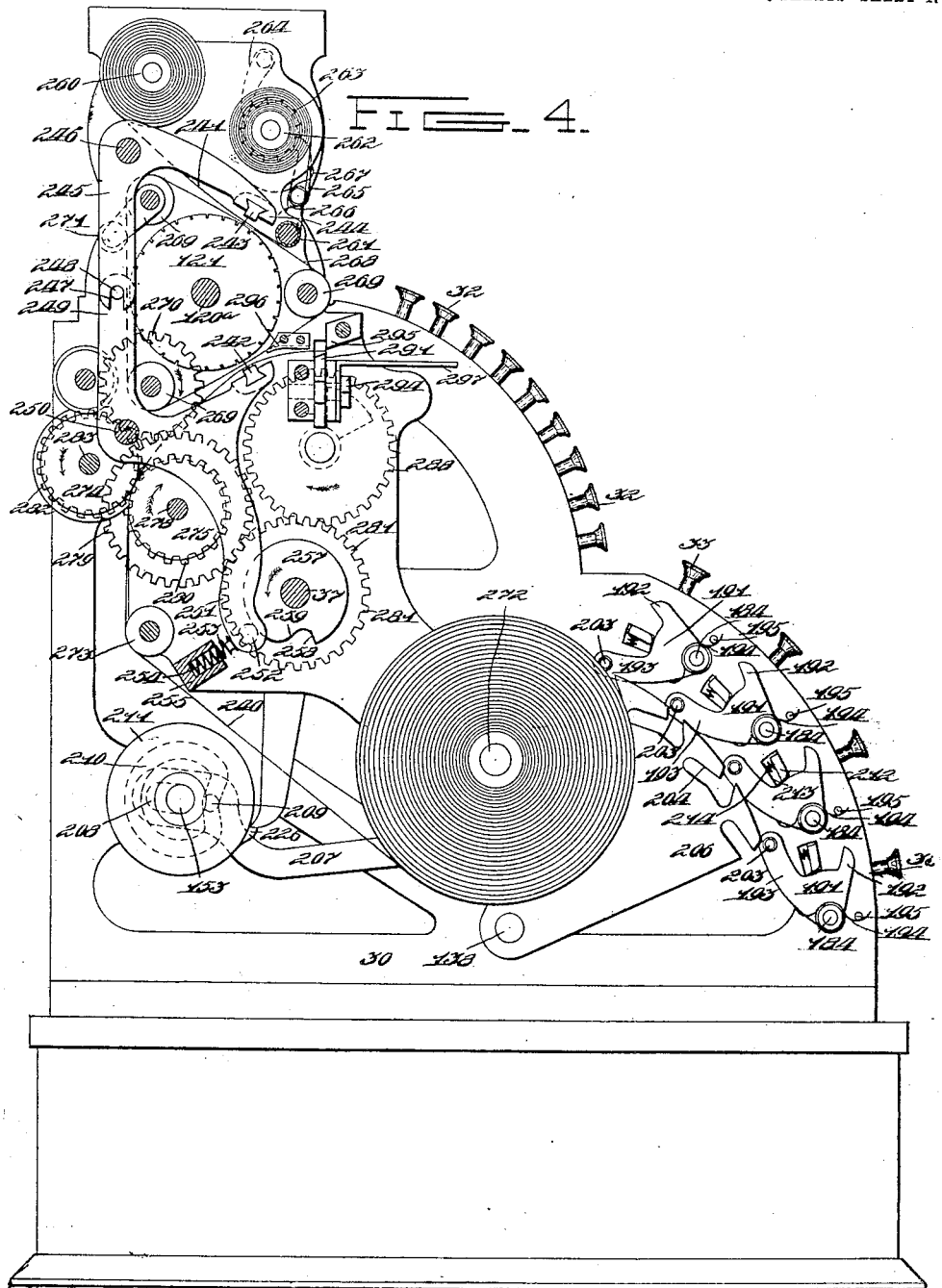

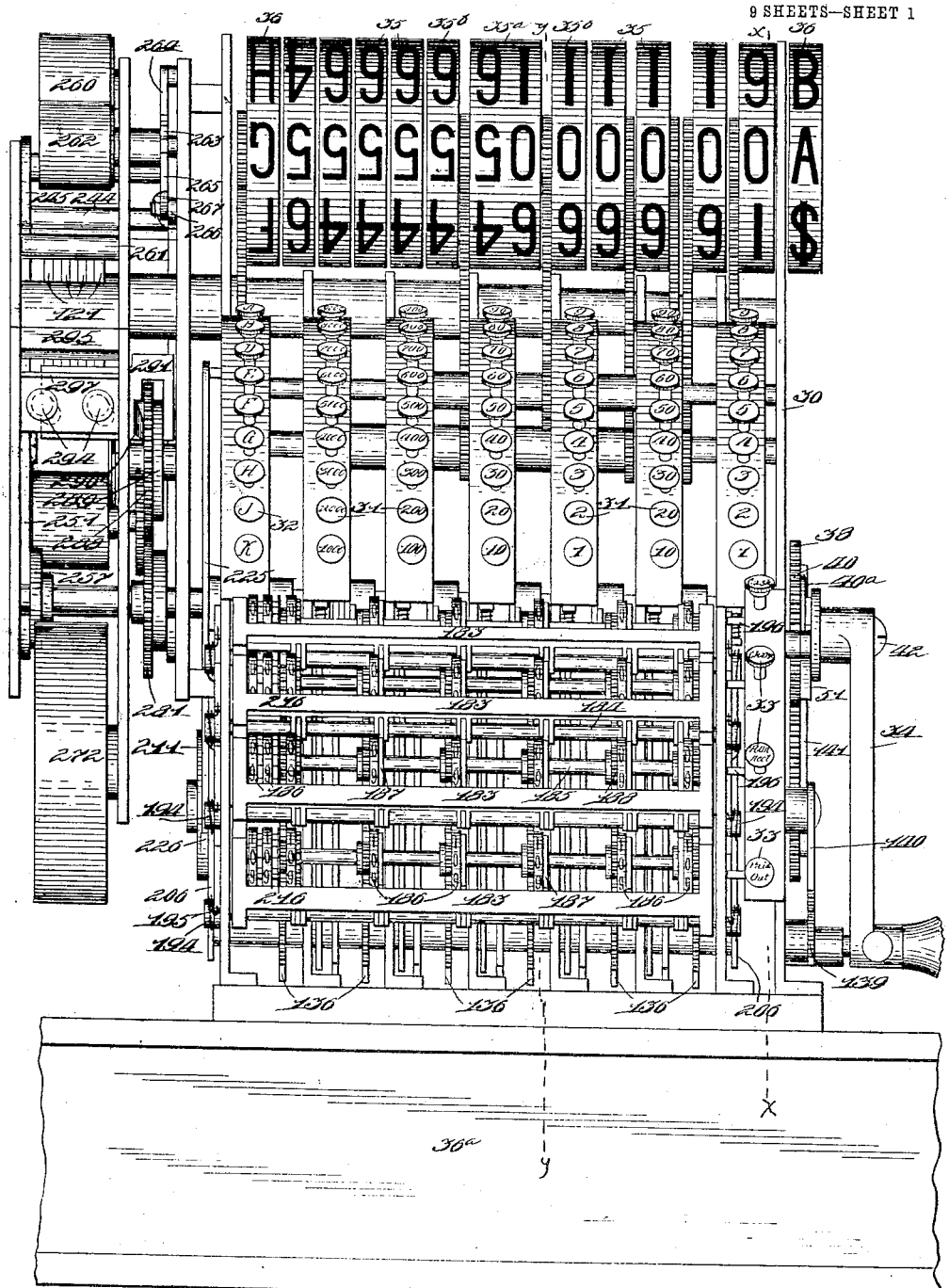

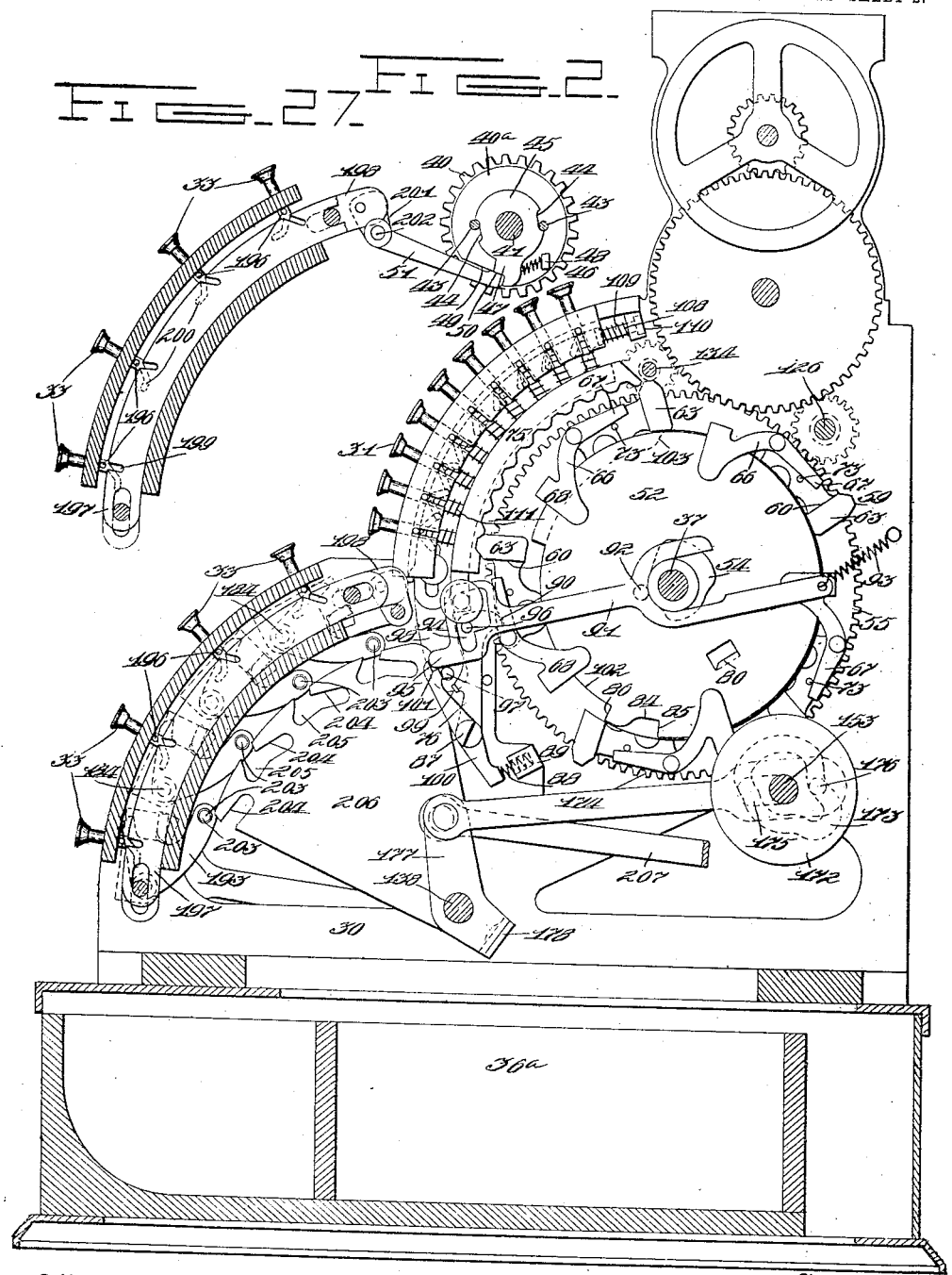

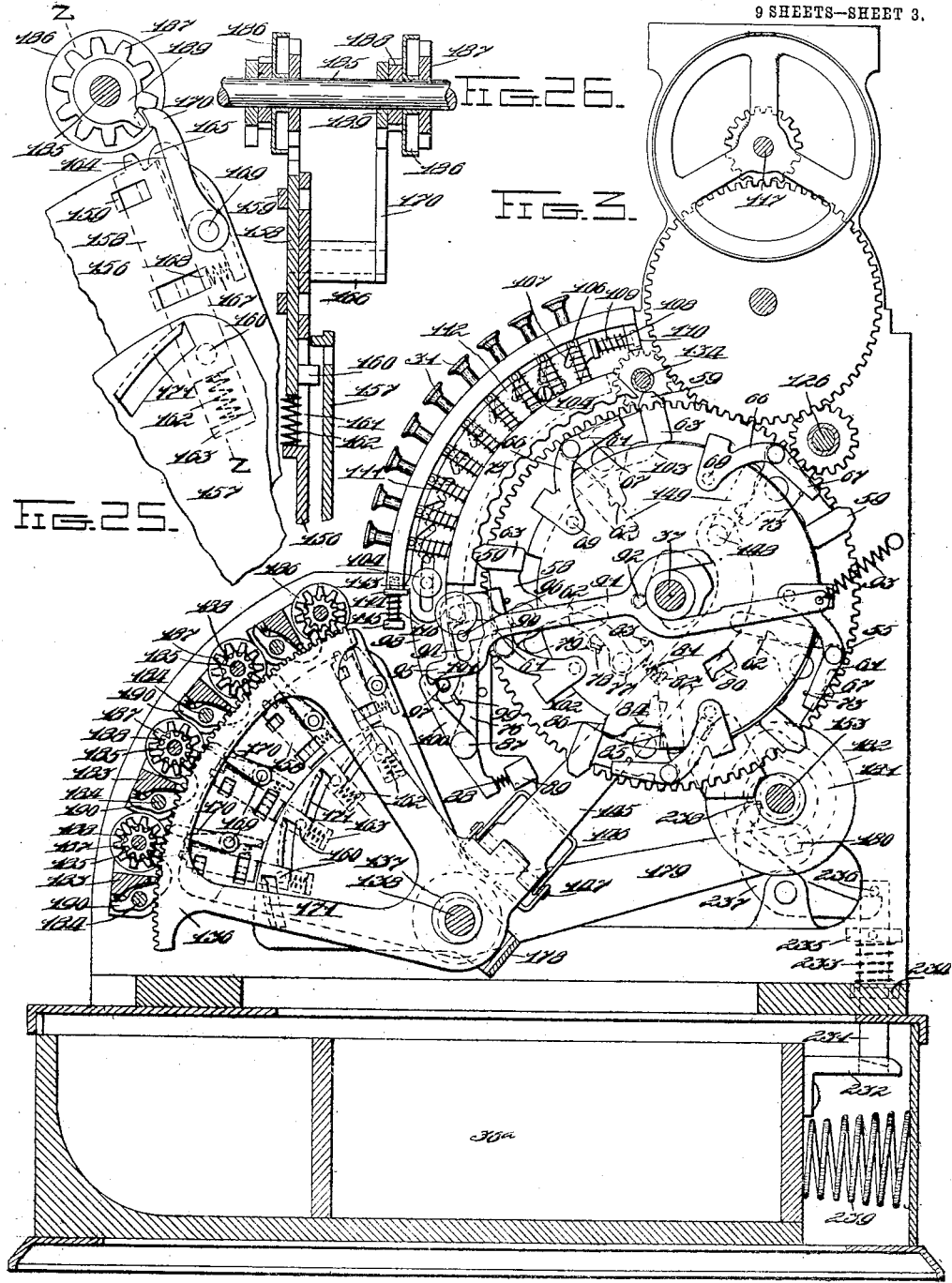

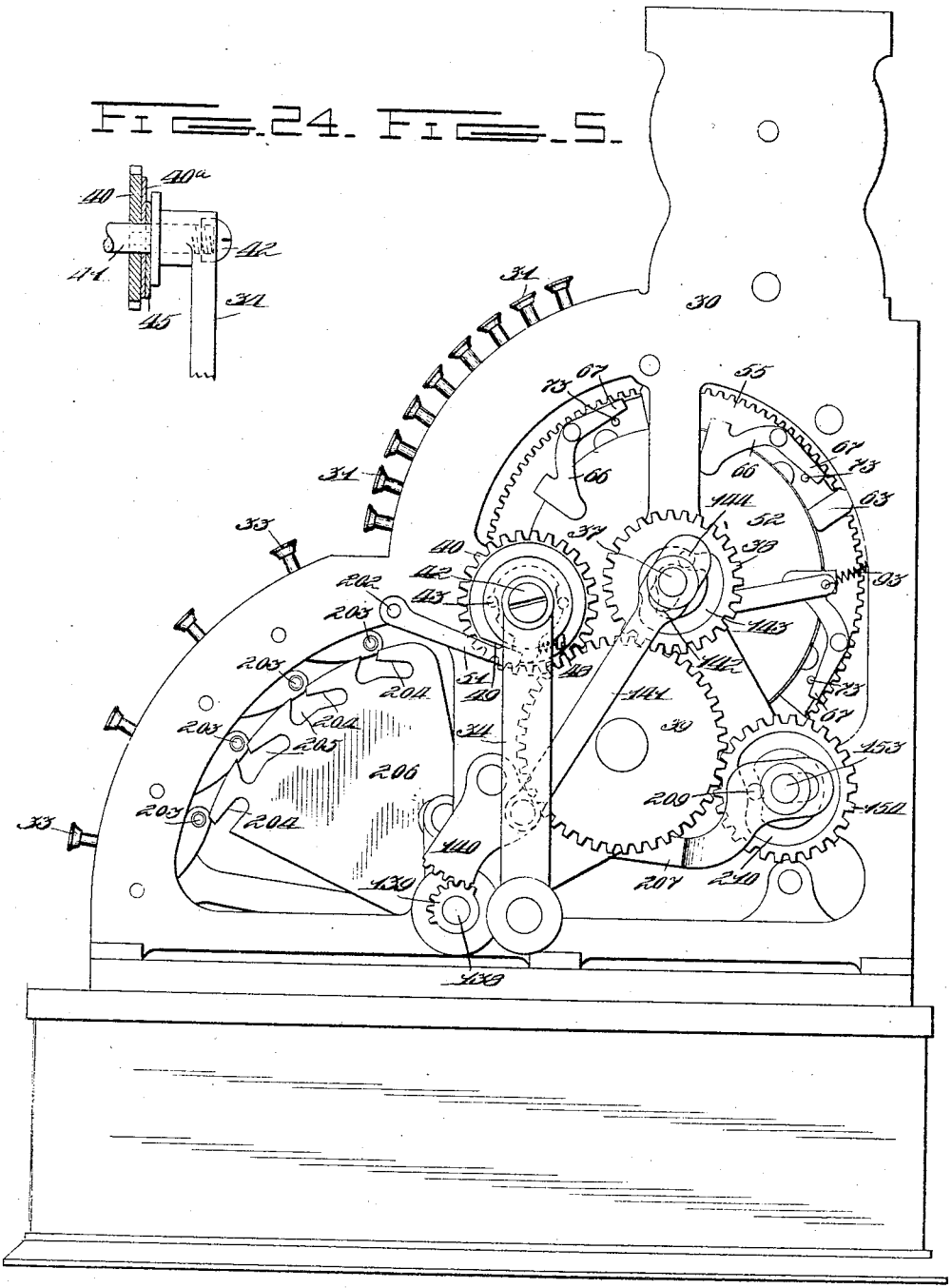

J. P. CLEAL & A. MACAULEY.
CASH REGISTER.
APPLICATION FILED NOV. 18, 1901.
920,110.
Patented May 4, 1909.
9 SHEETS—SHEET 6.
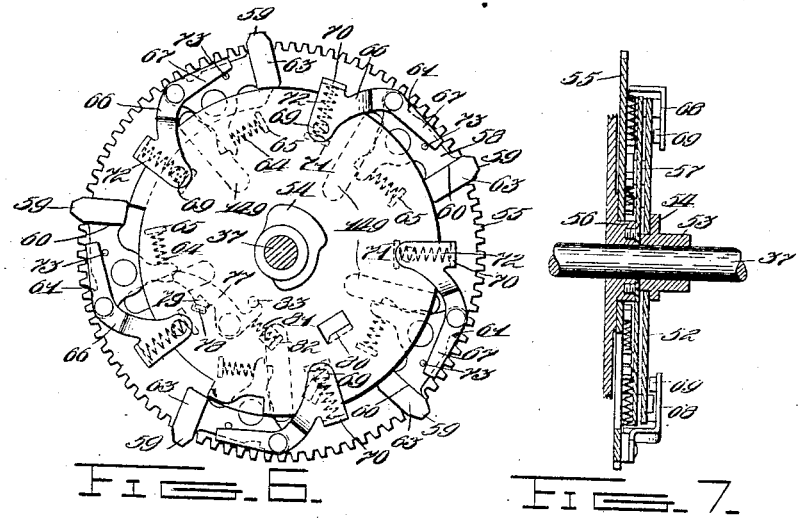
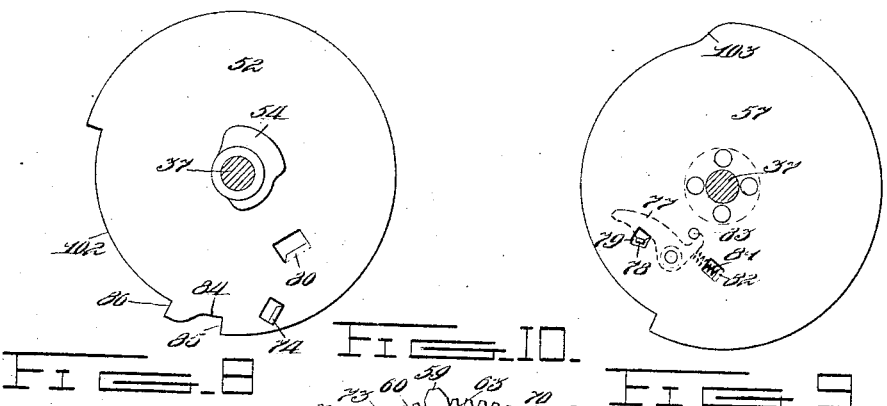
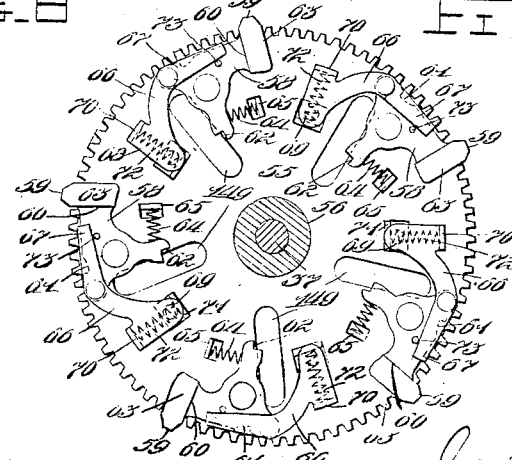

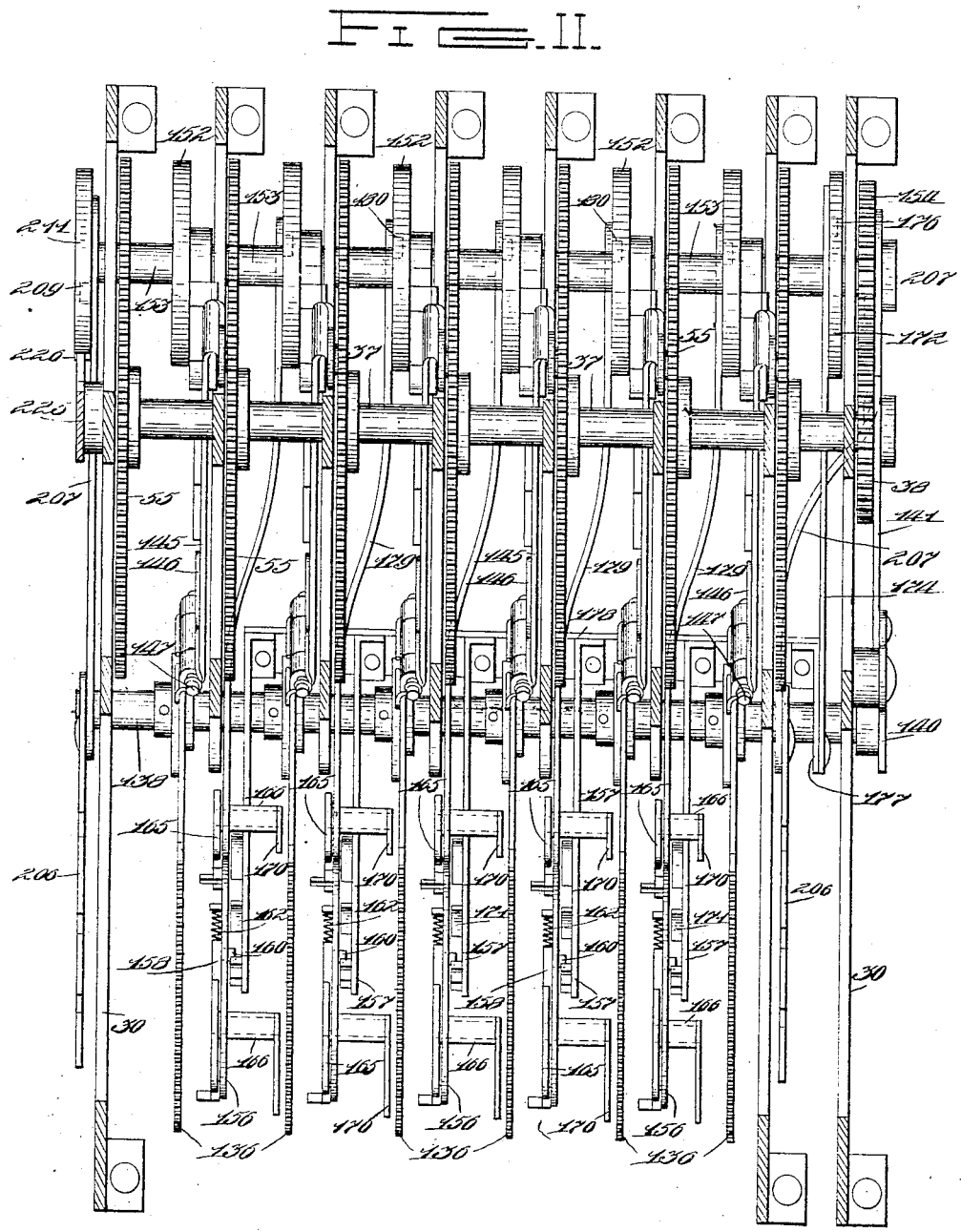

J. P. CLEAL & A. MACAULEY.
CASH REGISTER.
APPLICATION FILED NOV. 18, 1901.
920,110.
Patented May 4, 1909.
9 SHEETS—SHEET 8.
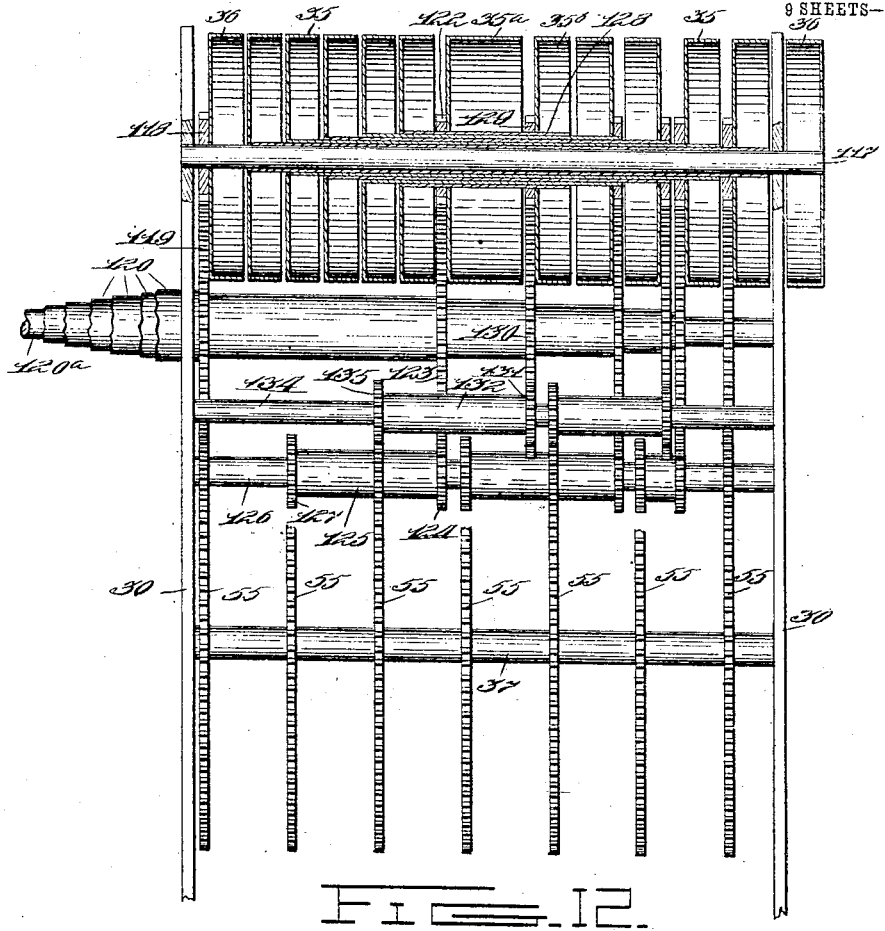
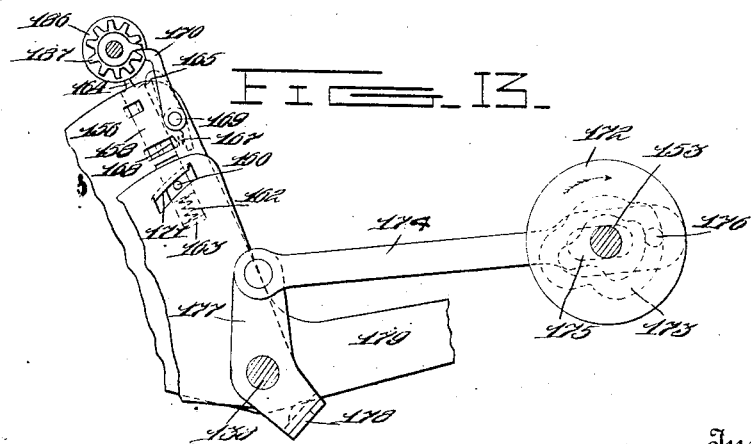
Witnesses
Inventors
Joseph P. Cleal
Alvan Macauley
By Alvan Macauley
Attorney

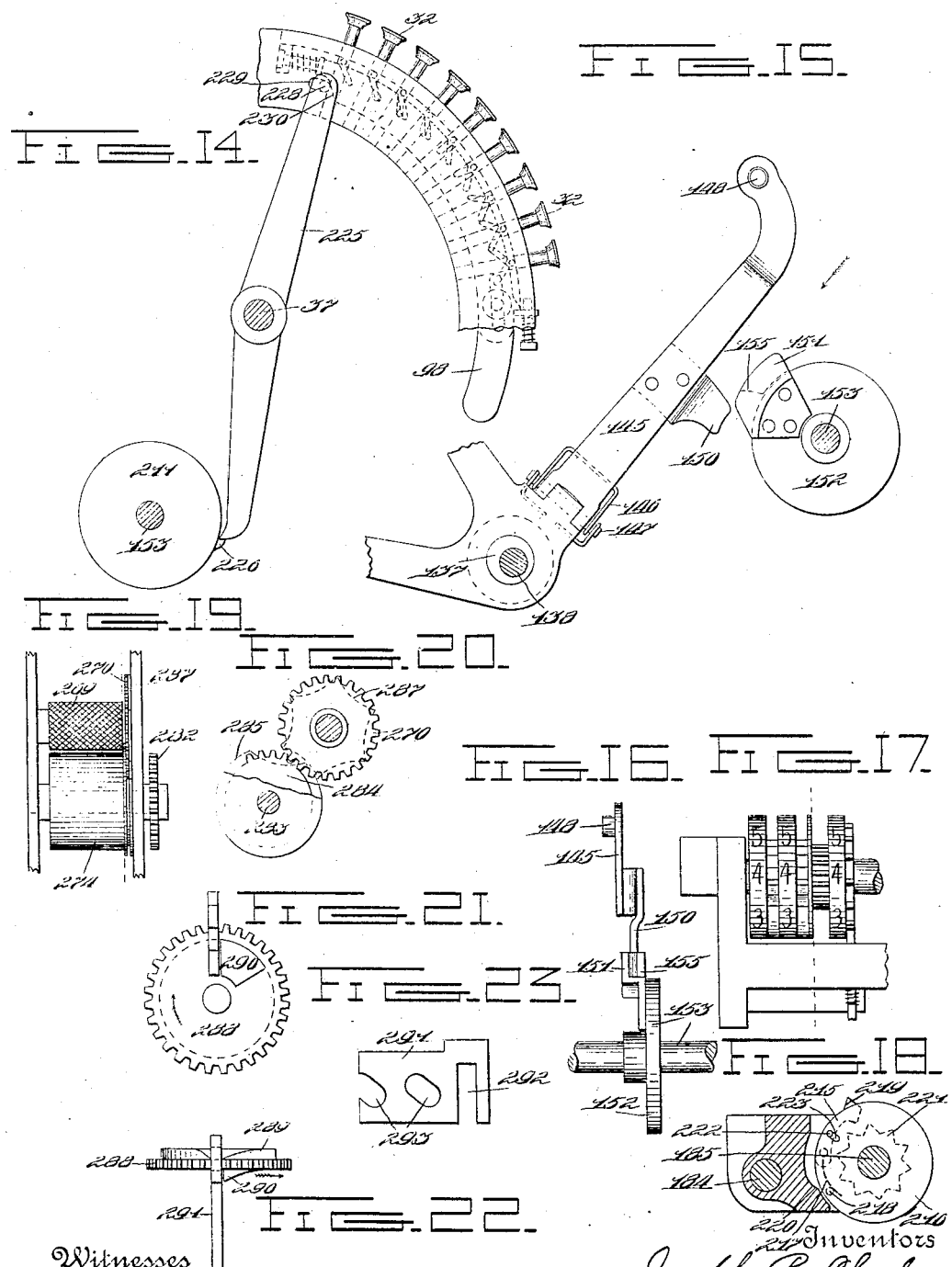

UNITED STATES PATENT OFFICE.

JOSEPH P. CLEAL AND ALVAN MACAULEY, OF DAYTON, OHIO, ASSIGNORS, BY MESNE ASSIGNMENTS, TO THE NATIONAL CASH REGISTER COMPANY, OF DAYTON, OHIO, A CORPORATION OF OHIO, (INCORPORATED IN 1906.)

CASH-REGISTER.

No. 920,110.  Specification of Letters Patent.  Patented May 4, 1909.

Application filed November 18, 1901. Serial No. 82,704.

*To all whom it may concern:*

Be it known that we, JOSEPH P. CLEAL and ALVAN MACAULEY, citizens of the United States, residing at Dayton, in the county of Montgomery and State of Ohio, have invented certain new and useful Improvements in Cash-Registers, of which we declare the following to be a full, clear, and exact description.

This invention relates to improvements in cash registers and has more particular relation to improvements in registers of the multiple counter type.

The principal object of the invention is to provide a machine of the character mentioned with an operating mechansim having a continuous forward movement in lieu of the usual oscillatory movement employed in cash registers.

In the accompanying drawings forming part of this specification: Figure 1 represents a front elevation partly broken away of a machine embodying our invention, the cabinet of the same being removed. Fig. 2 represents a vertical transverse section through the same on the line x—x of Fig. 1. Fig. 3 represents a similar section on the line y—y of Fig. 1. Fig. 4 represents an end elevation of a machine looking from the left, the cabinet being removed to expose the printer. Fig. 5 represents a similar view taken from the right-hand end of the machine. Fig. 6 represents an enlarged detail side elevation of one of the groups of registering elements comprising a driven gear, a stationary locking disk, a driving disk and the connecting parts. Fig. 7 represents an enlarged detail vertical section through the parts shown in Fig. 6. Fig. 8 represents an enlarged detail side elevation of the driving disk. Fig. 9 represents a similar view of the stationary locking disk. Fig. 10 represents a side elevation of the driven gear and parts carried thereby. Fig. 11 represents a detail top plan view of the driven gears, operating segments, rack segments, the coupling devices between the gears and segments and the transfer devices, all the other adjoining parts being omitted for the sake of clearness of illustration. Fig. 12 represents a vertical section through the double indicators and their operating gearing. Fig. 13 represents an enlarged detail side elevation of one of the transfer segments and its operating mechanism. Fig. 14 represents an enlarged detail side elevation of the clerk's key bank and the machine lock operated by the detent of the the same. Fig. 15 repsesents an enlarged detail side elevation of one of the coupling levers for the rack segment. Fig. 16 represents a rear elevation of the parts shown in Fig. 15, looking in the direction of the arrow shown in this latter figure. Fig. 17 represents an enlarged detail of the higher counter wheels of one of the counters showing the transfer between the same. Fig. 18 represents a vertical section through the devices shown in Fig. 17. Fig. 19 represents a detail rear elevation of the inked ribbon feeding roller and its actuating gear. Fig. 20 represents a detail end elevation of the same. Fig. 21 represents an end elevation of the movable check knife and its operating cam gear. Fig. 22 represents a top plan view of the same. Fig. 23 represents a detail front elevation of the movable knife. Fig. 24 represents a detail front elevation partly broken away of the operating handle, the gear carried thereby and the combined clutch and latch mechanism also carried thereby. Fig. 25 represents an enlarged detail side elevation partly broken away of one of the transfer devices. Fig. 26 represents a detail section through the same on the line z—z, and Fig. 27 represents a detail side elevation of the multiple counter setting keys, their detents and the latch controlled thereby.

In the aforesaid drawings 30 represents the frame of the machine 31 the amount keys, 32 the special clerks' keys, 33 the special counter keys, 34 the operating handle, 35 the amount indicators, 36 the special indicators and 36ª the cash drawer.

While for the sake of illustration the machine has been shown as provided with only one cash drawer it will be readily understood that the devices that control the respective independent counters may also control the locking devices of a series of independent cash drawers whereby if the machine is employed to keep separate the accounts of different clerks, each of said clerks may have an independent counter and independent cash drawer.

Generally described this machine comprises a rotary shaft carrying a series of driving devices which may be coupled and uncoupled from a series of driven gears having forward movements only, by the amount or clerks' keys which are operated. The driven gears are coupled and uncoupled from a series of oscillating rack segments into mesh with which any one of a series of independent counters may be brought. The indicators of the rotary type are geared to move continuously with the rotary driven gears.

The description of the above parts in detail will be arranged under the several captions or divisions following so that they may be more readily grouped and understood.

*The operating mechanism.*—The driving mechanism as before stated comprises a main driving shaft 37 suitably mounted in the frame of the machine and which has a continuous rotary movement imparted thereto through a gear 38 fast to the right hand end of same. This gear, as best shown in Fig. 5, meshes with an intermediate gear 39 mounted on the main frame and which in turn meshes with a gear 40 mounted fast on a short rotary shaft 41 which is suitably mounted in the main frame. The operating crank handle 34 is mounted on the shaft 41 and secured rigidly thereto by a suitable binding nut 42. The gear 40 as best shown in Figs. 5, 24 and 27, is provided with a disk 40$^a$ which in turn is provided with two spaced pins 43 which project laterally therefrom into elongated notches 44 formed at diametrically opposite sides of a disk 45 which is loosely mounted on the shaft 41. A coil spring 46 is interposed between a nose 47 formed on the disk 45 and a lug 48 mounted on the disk 40$^a$. The said disk 40$^a$ is formed with a notch 49 and the nose 47 is also formed with a notch 50. These two notches being arranged to receive a locking pawl 51 hereinafter described. When the locking pawl is depressed, it is disengaged from the notches 49 and 50 and the disk 45 is forced forward by its coil spring 46 so that the nose 47 passes above the locking pawl and holds the latter out of its locking position. The gear 40 and operating handle are then free to be turned forward until a complete revolution has been made and the pawl again allowed to enter the notches 49 and 50. The final movement of the operating handle again compresses the spring 46 and adjusts the disk 45 into the position shown in Fig. 27 ready for the next releasing operation. During the rotation of the handle, the end of the pawl 51 rides upon the periphery of the disk 40$^a$ and is thus held out of operative position until it again enters the notch 49. After the shaft 37 is unlocked it is given a single rotation and carries with it a series of driving disks 52, one for each of the banks of amount keys 31. These keys as shown in Fig. 1 are arranged in six banks representing respectively, units of cents, tens of cents, units of dollars, tens of dollars, hundreds of dollars and thousands of dollars and there is therefore a corresponding number of driving disks.

As the driving disks and coöperating parts are similar in construction and operation in the several banks, one group only will be described as this will suffice for all. In connection with the description that follows, particular attention is called to Figs. 6, 7, 8, 9 and 10. As shown in Fig. 7 the driving disk 52 is mounted fast upon a sleeve 53 which is fast to the shaft 37 and is formed with a cam 54, the office of which will be hereinafter described. The driven gear 55 is journaled upon a collar 56 which loosely surrounds the shaft 37 and is supported in position by the main frame. To the inner end of the collar 56 is secured a stationary disk 57. It will be seen from the above that the stationary disk is located between the driving disk and the driven gear. The gear 55 is provided with five pivoted arresting pawls 58, each of which is formed with an arresting nose 59, an operating shoulder 60, an arresting notch 61 and a latching notch 62. The arresting nose 59 and operating shoulder 60 of each pawl are formed on an enlarged head 63 of the pawl which is of a greater thickness than the remainder of the pawl so as to project over the periphery of the stationary disk 57 and the rotary disk 52 and rest thereon. Each of the enlarged heads 63 is normally held in contact with the periphery of the stationary disk 57 by a coil spring 64 interposed between a portion of the pawl 58 and a lug 65, turned up from the gear 55. Each pawl 58 carries a pivoted pawl 66 having an arresting nose 67 and angular extension 68 formed with a tripping lug 69 and a spring retaining lug 70. This spring retaining lug is in alinement with a lug 71 turned up from the gear 55 so that a coil spring 72 may be interposed between said lugs and normally hold the stop nose 67 against a stop pin 73. The angular construction of the arm 68 however brings lug 69 into alinement with an incline flange 74 mounted on the driving disk 52 so that when this flange contacts with the lug 69 the pawl 66 will be turned upon its fulcrum against the tension of the spring 72 to bring the nose 67 into a position in which it will be intercepted by the lower end of an operated key. When the pawl 66 is so arrested, the pressure is exerted upon its fulcrum which is on the pawl 58 and the latter is thus rocked so that its nose 59 is forced into engagement with a toothed stationary locking segment 75 to arrest the gear 55. (See Figs. 3 and 8.) Normally the pawls 66 abut against their respective stop pins 73 and are only thrown into operative position by being operated by the aforesaid incline flange 74 of the driving disk. One of the pawls 66 is also only operative during the time that the flange 74 is engaging its lug 69, as when the gear 55 is traveling with the driving disk. When the disk 52 is moving independently of the gear 55, the lug 74 will only operate the pawls 66 while passing the same and will instantly release them again and permit them to assume their normal positions. When the gear 55 is in normal position and the indicator at zero, one of the noses 59 is in the lowermost notch of the segment 75 and is doubly locked into this engagement, first by a pivoted latching lever 76 and second by a pivoted locking pawl 77. This pawl 77 is pivoted upon the stationary disk 57 and it is adapted to engage the locking notch 62 of the pawl 58 which occupies the normal zero position above mentioned. This pawl 77 is provided with a lug 78 which projects through an aperture 79 formed in the disk 57 and into the path of an incline flange 80 stamped up from the driving disk 52. The pawl 77 is held in its normal locking position by a coil spring 81 interposed between it and a lug 82 stamped up from said disk 57, a stop pin 83 on said disk 57 limiting the movement of the pawl. When the disk 52 is operated, the lug 80 engages the lug 78 and this moves the pawl 77 back out of engagement with the pawl 58 which then occupies the normal coupling position. This movement of the pawl 77 occurs at such a time that if the pawl 58 is otherwise free it will fall back into a notch 84 formed in the disk 52 and it will be engaged and carried forward by a shoulder 85 forming one end of the notch. If the pawl 58 however is not released from the latch lever 76, the pawl 77 will simply be operated and then resume its normal latching position. The office of the pawl 77 is to prevent the pawl 58 from moving back too soon in which event it would be caught up and carried forward by a shoulder 86 which is intended for another purpose hereinafter described. The aforesaid latch lever 76 is pivoted upon a screw bolt 87 and is normally forced into its latching position by a coil spring 88 interposed between its lower end and a socketed lug 89 formed on the main frame.

The upper end of the latch lever 76 is formed with a nose 90 which is adapted to enter the notches 61 of the pawls 58 and thus lock said pawls into position against forward movement. The latch lever is operated to release the pawl by a reciprocating bar 91 which is slotted to straddle the rotary shaft 37 and is provided with a pin 92 which is engaged by the aforesaid cam 54. The bar 91 is normally drawn rearward into the position shown in Fig. 2 by a coil spring 93 which connects its rear end to the main frame. The forward end of the bar 91 is formed with an angular slot 94 and a nose 95. A pin 96 mounted on the latch lever 76 projects into the angular slot 94. The nose 95 rests upon a pin 97 projecting from the lower end of a slidable key detent 98 so that when the detent is raised by the operation of one of the amount keys, the forward end of the bar 91 will be also elevated and the pin 96 thus caused to enter the vertical portion of the slot 94. It will be seen from the above that if the bar 91 is now reciprocated the latch lever 76 will be disengaged from the pawl 58 which it is holding. The formation of the cam 54 is such that the bar 91 is first moved forward a slight distance to disengage the nose 90 from the notch 61 of the pawl which it is holding and is then subsequently moved farther forward to cause a lug 99 formed on the latch lever to engage and operate a latch lever 100 which is also mounted on the screw bolt 87 and is spring pressed into engagement with the pin 97. When the detent 98 is elevated the shoulder 101 on the latch lever passes under the pin 97 and thus locks the detent and also the operated key. Near the completion of the operation of the machine the lug 99 forces the upper end of the latch 100 forward and allows the pin 97 to escape and descend with the detent which operation releases all the depressed keys. If the keys in certain banks have not been operated, the forward ends of the bars 91 will not be elevated and the reciprocations of said bars will therefore have no effect upon the latches 76. When a key is operated however, the pawl 58 occupying the normal zero position is released in the manner above described and is carried forward by the shoulder 85 of the driving disk until the nose 67 of the pawl 66 contacts with the inwardly protruding end of the operated amount key when the pawl 66 is arrested and thus swings the pawl 58 on its fulcrum and forces the nose 59 into engagement with the teeth of the locking segment 75. This movement simultaneously disengages the shoulder 60 of the pawl 58 from the shoulder 85 of the driving disk so that the periphery of said disk can ride under the head 63 and thus lock the pawl 58 into engagement with the locking segment. It will be seen from the above that all that now holds the operative pawl 58 into engagement with the locking segment 75 is the periphery of the driving disk 52. If during the succeeding operation of the machine no amount keys are operated in the particular bank under consideration, the driving disk will release the pawl 58 when the reduced portion 102 of said disk is reached and the pawl will be immediately forced backward by its spring 64 so as to bring the shoulder 60 into the path of the shoulder 86. The pawl will be thus picked up and carried with the driving disk until the zero position is reached when the head 63 of the pawl will ride up a cam 103 formed on the stationary disk 57 and be thus disengaged from the disk 52 which will complete its movement alone. Should an amount key however, have been operated in this bank the next operating pawl 58 upon reaching the normal position would not become locked, but would fall into an engagement with the shoulder 85 so as to be carried forward with the disk 52 until arrested by the operated key. In this instance the previously operated pawl 58 would be carried forward with the gear through the medium of the pawl 58 then in use until moved into inoperative position by the cam 103 on the stationary disk. The periphery of the stationary disk 57 is so formed that when one of the pawls 58 is in the normal zero position, as is shown in Figs. 2 and 3, all the remaining pawls will be held out of the path of the shoulders 85 and 86 so that the disk 52 will be free to rotate without engaging any of the pawls. As soon, however as the pawl 58 in the normal zero position is moved forward, the succeeding pawl is brought into alinement with the reduced part of the disk 57 and is thus free to move inward when the shoulder 85 next comes past the same, that is, provided the latches 77 and 76 have been previously operated as before described.

It will be seen from the above that the movements of the driven gear wheels 55 are continually forward and that upon the operation of the crank handle 34, the gears 55 are picked up and turned either to the zero position, or past this position to a sufficient extent to accomplish the new registration and indication.

Each of the segmental detents 98 is mounted under the keys of its respective bank by means of headed screw bolts 104 which project through elongated slots formed in the detent. Each of the keys 31 comprises a suitably numbered head and a shank 105. These shanks are slidably mounted in the main frame and each of the same is provided with a laterally projecting pin 106 which when the key is depressed enters one of a series of incline slots 107 formed in the detent and thus elevates the same so that it will become latched by the latch lever 100 in the manner before described. When the latch lever 100 is operated to release the detent, the same is returned to its normal position by a coil spring 108 which surrounds a headed plunger 109, which plunger projects through an apertured lug 110 of the main frame and contacts with the detent. The opposite ends of the spring 108 engage the head of the plunger and the lug 110 so that when the detent is elevated it is against this spring tension. The keys are held in their normal positions by coil springs 111 which surround their shanks and engage with their opposite ends against pins mounted in said shanks and the aperture guard plates through which the shanks pass.

In addition to the regular detents 98, each of the banks of keys is provided with an additional locking detent 112 mounted beside the regular detent and in a similar manner to the same so that the incline slots formed in same will be in the proper position to receive the key pins 106. By this construction the operation of each of the keys will move the detent 112 to a different extent, or in a different direction and it will thus be impossible to operate two of the keys at once, or one key after another and before the first key has returned to normal position. As the detent 112 is constructed to be moved in opposite directions it becomes necessary to provide means for centering it when released. For this purpose the upper end of the detent contacts with the plunger 109 while the lower end of the same is formed with a nose 113 which rests upon a washer 114 surrounding a pendent bolt 115 and resting upon a coil spring 116 which also surrounds the bolt. This bolt is suitably screwed on a part of the main frame so that its lower headed end will support the spring 116 in position.

From the above description it will be seen that the driven gear wheels 55 are operated upon the movement of the crank handle which will first bring one of the pawls 58 to the normal position and then give the gear an additional movement equal to the value of a key operated.

*The indicators.*—The arrangement of both the amount indicators 35 and special indicators 36 is best illustrated in Figs. 1 and 12 and reference is therefore made to the same in connection with the following description. The two indicators 36 which are adapted to indicate respectively to the front and back of the machine are provided with characters corresponding to the characters of the special keys 32 and are mounted fast upon the opposite ends of a transverse shaft 117 which is suitably journaled in the main frame so that the indicators turn in unison. One of these indicators is provided with a gear wheel 118 which meshes with a gear 119 mounted in the outermost of a series of nested sleeves 120 which carry the respective printing wheels 121. The gear 119 meshes in turn with the gear wheel 55 of this special clerk's key bank. The movement of this gear 55 therefore sets the special indicators to bring the desired indications into view at both front and back of the machine and simultaneously set the printing wheel of this particular bank. The double indicator 35$^a$ for indicating thousands of dollars to the opposite sides of the machine is journaled upon the outermost of a series of nested sleeves upon which the respective groups of indicators are mounted. This indicator is provided with two sets of numerals including from zero to nine and arranged in the reverse order of reading. This indicator is provided with a gear wheel 122 which meshes with a gear 123 fast to one of the nested sleeves 120. The gear 123 as best shown in Fig. 12, meshes with a pinion 124 fast to one end of a sleeve 125. This sleeve is mounted upon a transverse shaft 126 which is mounted in the main frame and carries a companion pinion 127. This latter pinion meshes with the gear wheel 55 of the thousands of dollars bank. The hundreds of dollars indicators 35$^b$ are fast to opposite ends of a sleeve 128 and one of the same is provided with a gear wheel 129. This gear meshes with a gear wheel 130 mounted on one of the sleeves 120. The gear 130 meshes with a pinion 131 fast to one end of a sleeve 132 which is journaled upon a transverse shaft 134, this latter being mounted in the main frame. The sleeve 132 is provided with a companion pinion 135 which meshes with the gear 55 of the hundreds of dollars bank. The tens of dollars indicators, units of dollars indicators and units and tens of cents indicators are mounted on the opposite ends of nested sleeves in a similar manner to the indicators 35$^b$ and are connected through their respective sleeves 120 and operating gears 55 in substantially the same manner by sleeves carrying pinions and mounted on the respective shafts 126 and 134. This construction is so apparent from an inspection of Fig. 12 that it is not deemed necessary to go minutely into a detail description of each connection as they are all practically the same.

From the above it will be seen that the several indicators follow exactly the movements of the operating gears 55 and are thereby moved forward only, first to a zero position and then to a position for disclosing the new indication. It will also be seen that the printer wheels which are arranged on the outer ends of the nested sleeves 120 and the shaft 120$^a$ supporting the same, are also given this forward rotary movement and are not oscillated back and forth as usual with the printer wheels of this class of machine. The forward movements of the gear wheels 55 are also utilized to secure the desired graduated movements of the operating elements for the several independent counters.

*Counter operating mechanism.*—The counter operating mechanism comprises primarily a series of rack segments 136 which are journaled on sleeves 137. These sleeves are eccentrically mounted upon a transverse rock shaft 138 so that the rack segments may be moved toward or away from the counters. When the sleeves are in their normal positions as shown in Fig. 3, the rack segments are in the proper position to engage with the counter pinions when the counters are thrown in, but when the shaft 138 is rocked after the rack segments have been actuated, the segments are withdrawn from the counter pinions until the counter wheels are free to turn independently of the segments so that the transfer may be effected without any additional movements of said segments. The rocking of the shaft 138 is accomplished by a mutilated pinion 139 mounted upon the end of the shaft, as best shown in Fig. 5 and meshing with a segmental rack plate 140 which is pivoted upon the main frame. A link bar 141 is pivoted to the plate 140 at one end and is formed at its opposite end with an elongated slot 142, through which the main rotation shaft 37 passes. The face of the gear 38 is formed with a cam groove 143 into which projects a pin 144, mounted on the link bar so that when the gear 38 is rotated the bar will be reciprocated and through the above described connection, the shaft 138 will be rocked. The registering movements of the rack segments 136 are effected by pivoted arms 145 which are mounted on respective segments and forced normally into engagement with the slots of their respective gears 55 by springs 146 which are coiled about the pivoted pins 147 and bear with their opposite loops against said arms and the aforesaid segments. The rear ends of the arms are suitably bent to bring them into proximity to their respective operating gears 55 and are provided with anti-friction rollers 148 as more clearly shown in Fig. 15. These rollers are arranged to pass into radial slots 149 formed in the respective gears 55. When the devices are in the normal position, shown in Fig. 3, each of the rollers 148 projects into one of the slots 149 of its respective gear 55 so that when this gear is moved, as before described, a distance determined by the operated key, the corresponding rack segment 136 will be similarly moved. As the gears 55, however, must be subsequently given an additional movement to bring them to the zero position upon the commencement of the succeeding operation, it is necessary to disengage the rollers 148 from the walls of the slots 149 and also return the arms 145 to their normal positions. To effect this result, each of the arms is provided with a lug or nose 150 which is arranged to be engaged by a beveled projection 151 mounted on a disk 152 which is fast to and moves with a rotary shaft 153. This shaft receives its movement from the gear 39 which meshes with a gear 154 fast thereon, as best shown in Fig. 5. By reference to Figs. 15 and 16, it will be seen that the beveled projection is arranged to engage and move the lug 150 laterally during its initial engagement therewith and to then force said lug 150 upward by means of an inclined shoulder 155 formed thereon. The initial or lateral movement of the lug 150 disengages the roller 148 from the slot 149 into which it is projected, while the upward movement of the lug 155 returns the rack segment 136 to its normal position. The relative arrangement of the parts 150 and 151 is such that this operation of the lever 145 will take place with the end of the operation of the machine. If the amount has been registered in a certain bank and the gear 55 of that bank left in the position to which it was turned, the return movement of the lever 145 will leave the roller 148 bearing against its gear 55 and this roller will only enter the next succeeding slot 149 when the gear is returned to its normal zero position, upon the succeeding operation of the machine.

It will be seen by the above that the lever 145 does not become coupled to its gear 55 until the latter reaches its normal position and the movement of the gear to reset this and other parts to the zero position is thus independent of the lever 145.

The above described arrangement is applicable to any of the banks and amount keys, but the bank of clerks' keys, of course, has no such connections.

The above described devices provide for the regular movement of the counter wheels hereinafter described, but as it is necessary to effect a transfer from one of the counter wheels to the next higher wheel, after a complete revolution has been made, the following transfer mechanism is provided.

*Transfer mechanism.*—This mechanism comprises a series of rock segments 156 and a series of companion segments 157, all journaled upon a rock shaft 138. Each of the segments 156, as more clearly shown in Figs. 25 and 26, is provided with a series of sliding plates 158 guided thereon by suitable lugs 159 stamped up from the plate. Each slide is provided with a stud 160 which projects through a slot 161, formed in the segment 156 for a purpose hereinafter described. A coil spring 162 is interposed between the inner end of the slide 158 and a lug 163, stamped up from the plate. The forward or outer end of the slide is formed with a single tooth 164 which is arranged to engage a counter pinion to effect the transfer. The slide 158 is held in its normal inoperative position by a pivoted latch 165 which projects over the top of the same. This latch is mounted on one end of a sleeve 166 and is normally spring pressed into engagement with the slide 158 by a coil spring 167 interposed between the latch and a lug 168 on the segment 156. The sleeve 166 is journaled upon a stud 169 mounted on the segment 156 and carries at its outer end a trip arm 170 which is arranged to be operated by a suitable tripping device on one of the counter wheels. When the tripping arm 170 is operated, the latch 165 is disengaged from the slide 158 and the spring 162 forces the slide forward until the stud 160 contacts with the under side of an incline flange 171 mounted on the segment 157. The parts then assume the positions shown in Fig. 13. It will be seen by reference to this figure that the tooth 164 is not in position to engage the counter pinion and that the slide 158 has advanced sufficiently to prevent the latch 165 from again engaging over the top of same.

By reference to Fig. 25, which shows the parts in their normal positions, it will be seen that the flange 171 is not in the path of the stud 160, but the initial movement of the crank handle moves all of the segments 157 slightly forward so as to bring said flanges over the stud 160 for the purpose above described. A further movement of the operating handle has no effect upon the segments 157 until after the regular registering operation has taken place, when the segments are moved back to normal position so that the slides 158, which have been released, may move farther forward to bring the teeth 164 into mesh with the counter pinions. After the segments 156 have been oscillated to effect the transfer, the segments 157 are again moved forward and the flanges 171 engaging the studs 160 force the slides 158 inward and relatch the same, the final movement of the crank handle again returning the segments 157 to normal position. These peculiarly timed movements of the segments 157 are accomplished by disk 172 mounted on the shaft 153 and formed with a cam groove 173. A link bar 174 is slotted as at 175 to receive the shaft 153 and is provided with a stud 176 which projects into the cam groove. The link 174 is pivotally connected to a crank arm 177 which is pivoted on the shaft 138 and connected to a cross bar 178. This bar 178 connects all of the segments 157 as clearly shown in Fig. 11. The segments 156 are successively oscillated by rigid arms 179 formed thereon and projecting rearwardly into proximity to the shaft 153 where they are provided with studs 180. These studs project into cam grooves 181 formed in disks 182 which are fast on the shaft 153. The relative formation of the grooves 181 is such that the levers 179 will be successively operated.

*The counters.*—The independent counters which coöperate with the above described operating rack segments and transfer devices are all substantially similar and the following description of one of the same will therefore suffice for all. Each of these counters includes a frame 183 pivoted upon a transverse shaft 184. This frame supports a transverse shaft 185 upon which all of the counter wheels 186 are journaled. By reference to Fig. 1, it will be seen that besides a counter wheel for each of the amount banks, there are also two additional counter wheels which will make the capacity of the machine $999,999.99. Each of the counter wheels is provided with numerals from 0 to 9, suitably stamped, printed or embossed upon its periphery and further, each of the same is provided with a transfer gear 187, a registering pinion 188 and a transfer cam 189. When one of the counter wheels has made a complete revolution, through the engagement of its pinion 188 with its rack segment 136, the cam 189 will operate the trip arm 170 and cause the transfer slide 158 of the next higher counter wheel to move into set position so that when subsequently operated in the manner before described, it will engage the gear 187 of the next higher counter wheel and turn the same a distance equal to one tooth. Any overthrow or retrograde movement of the counter wheel is prevented by a spring pressed pivoted pawl 190 mounted upon its shaft 184 and engaging its gear wheel 187. The counters are thrown into and out of mesh with the rack segments 136 by devices which are best illustrated in Figs. 2, 4 and 5. As these devices at opposite ends of the machine are similar in construction and operation and are simply duplicated to prevent torsion of the shafts 184, those in Figs. 2 and 4 only will be described. Each shaft 184 is provided at each end with a rigid plate 191 having two arms 192 and 193. A coil spring 194 surrounds each shaft 184 and bears with its opposite ends against its respective plate 191 and a stop pin 195 mounted on the main frame so as to normally hold the parts in their normal positions shown in Figs. 2, 4 and 5 and with the counter pinions out of mesh with the rack segments. The plates 191 are rocked with the shafts 184 to set the respective counters for operation, by means of the special counter keys 33. These keys, as best shown in Fig. 1, are arranged at the extreme right hand side of the machine, and in the present instance are represented as indicating "Cash," "Charge", "Received on account" and "Paid out", but this is simply arbitrary, as the keys and counters may represent any different designations or departments desired. Each of the keys 33 is similar in construction to the amount keys and their transverse pins 196 are arranged to coöperate with two segmental detents 197 and 198, mounted in substantially the same manner as the regular amount detents. The segment 197 is simply a key locking segment and formed with a series of differently inclined slots 199 into which the key pins 196 are arranged to pass. As the different keys move this detent different distances, no two of the keys can be operated at the same time, nor can one key be operated after another until the first key has returned to its normal position. The detent 198 is formed with uniform angular slots 200 into which the pins 196 are arranged to pass. When any one of the keys 33 is operated, the detent 198 is moved upward and as the upper end of this detent is pivotally connected to a crank arm mounted upon a rock shaft 202, the movement of the key will rock the shaft. The shaft 202 carries the before mentioned latching pawl 51.

It will be seen from the above that the machine remains locked until one of the keys 33 is operated and that therefore some one of the counters must be in operative position before any indicating or printing can be done. In addition to the above, the machine is provided with a locking device connected to the special clerks' keys for preventing the operation of the machine until one of the same is depressed, which construction will be presently described.

When the latch lever 51 is operated by the detent 198, the spring impelled latching piece 45 is released, as before described, and by its engagement with the outer surface of the latch 51 tends to further depress said latch as it passes forward. This further depression of the latch 51 is permitted by the angular portions of the slots 200 in the detent 198. The above described movement of the lever 51 moves it clear of the walls of the notch 49 and said lever is held in this position by the periphery of the disk 40ª against which said latch lever rests. The special keys thus remain locked during the entire operation of the machine and are not released until the latch lever 51 again enters the notch 49. When one of the keys 33 is depressed, its pin 196 which extends to both sides of the key shank, contacts with the arm 192 of its respective plate 191 and rocks the latter sufficiently to bring an anti-friction roller 203 carried by the arm 193 into the path of a cam wall 204 of a slot 205 formed in a rocking segment 206, so that when this segment is subsequently rocked upon the operation of the machine, the shaft 184 and the counter frames will be further operated to bring the counter pinions into mesh with the rack segments. As the cam slot receives the roller 203 of the operated counter and its walls hold said roller during the registering movements, the counter pinions are held firmly into engagement with the rack segments during the entire registering operation. The movements of the segments 206 are accomplished by pivoted link rods 207 connected thereto and formed with elongated slots 208 which receive the shaft 153. A stud 209 mounted on the link bar projects into a cam groove 210 of the disk 154 fast to the aforesaid shaft. The formation of the cam groove 210 is such that the bar 207 is moved forward upon the initial movement of the crank handle and is not moved back again until the final movement of the same. To further assist the counter frames in returning to normal position when released, each of the same is provided with a laterally projecting lug 212, which projects through an aperture 213 formed in the main frame to limit its movement and is normally periphery of a notched disk 257 which is mounted upon the protruding end of the shaft 37. The notch of the disk 257 is formed with a radial wall 258 and a cam wall 259. When the shaft 37 is rotated the stud 252 upon reaching the notch is forced inward along the radial wall and thus causes the platen levers to operate the platen and effect the printing. As the movement of the shaft 37 continues, the cam wall 259 again forces the stud 252 rearward and puts the spring 254 under tension ready for the next operation of the platen, which construction is old and well known in the art.

The detail record strip 241 passes from a supply roller 260 mounted on the printer frame downward under the platen 243, about an antifriction roller 261 and thence upward to the feeding roller 262 also mounted upon the printer frame. This latter roller carries a ratchet wheel 263 which is engaged by a gravity pawl 264 to prevent retrograde movement, and by a feeding pawl 265 to feed the same forward. The pawl 265 is mounted upon an extension arm 266 of the platen bar 244 and is thus reciprocated upon each movement of the platen. The pawl is held in engagement with the ratchet 263 by a spring 267, coiled about the pivoted pin of the pawl and having its opposite ends hooked over the arm 266 and the back of said pawl.

The endless inking ribbon 268 passes about three triangularly arranged antifriction rollers 269 which are mounted upon the printer frame and one of which is provided with a gear wheel 270, whereby the ribbon is fed forward upon each operation of the machine. A pivoted, weighted roller 271 engages the ribbon to hold the same taut. The ribbon passes between the two strips 241 and 240 and the type wheels. The roller 262 may be provided with any suitable device for turning the same forward to space the strip when so desired. The check strip 240 is fed from a supply roller 272, over a guide roller 273 and between two feeding rollers 274 and 275. The roller 275 is fast upon its supporting shaft 278 which latter is suitably journaled in the printer frame. The shaft 278 is provided with two gears 279 and 280. The gear 279 meshes with a gear 281 fast on the shaft 37. The gear 280 meshes with a gear 282 fast to the shaft 283 of the roller 274, said shaft being suitably journaled in the printer frame.

The shaft 283 as best shown in Figs. 19 and 20, is provided with a mutilated pinion 284 and a notched disk 285. The lower ribbon supporting roller 269 is preferably roughened and carries a gear wheel 270 and a star wheel 287. The gear wheel 270 is arranged to be intermittently actuated by the mutilated gear 284, while the notched disk 285 is arranged to coöperate with the star wheel 287 to lock the feeding roller 269 during the time when the mutilated gear is disengaged from the operating gear 270. As this construction is old and well known in the art, no further description is thought to be necessary.

The driving gear wheel 281 also meshes with a gear 288 which is best shown in Figs. 4, 21 and 22. This gear is suitably journaled on the printer frame and is formed upon opposite sides with cam projections 289 and 290, as shown clearly in Fig. 22. The office of these cams is to operate the movable cutting blade 291 which is formed with a slot 292 whereby it may straddle the gear 288 and also with incline slots 293 through which suitable screw bolts 294 are passed to secure the blade movably on the printer frame. A stationary cutting blade 295 is secure to the printer frame immediately above the blade 291. The check strip after leaving the platen 242 passes under a guide plate 296 and out between the knives 291 and 295 so as to rest upon a supporting table 297. When the gear 288 is rotated so as to bring the cams 289 and 290 into engagement with the movable knife, the latter is moved laterally and because of its slot and pin connection with the printer frame is forced diagonally upward to give a shearing cut and sever the check strip. The construction of the cam 289 is such that the knife 291 is locked in position against any movement except during the period when it is engaged by the cam 290.

In the present instance, only four different counters and no totalizing counter have been illustrated, but it will be readily apparent that the device could be so constructed as to employ any number of counters by simply extending the operating rack segments. One of the counters could also be very readily arranged to be thrown into operative position at each operation of the machine so as to comprise a totalizing counter for all of the remaining counters.

The devices, of course, are inclosed within a suitable cabinet which is provided with sight apertures for the indicators and the counters, and with movable covers whereby the counter wheels may be readily reached to turn same to zero.

In the event of a machine such as shown, being provided with multiple drawers, it would simply be necessary to connect the drawer controlling devices with the special keys 33. In such case, however the independent counters would be used by different clerks so that the different accounts might be kept altogether separate, both in the counters and in the cash drawers.

While the form of mechanism here shown and described is admirably adapted to fulfil the objects primarily stated, it is to be understood that it is not intended to confine the invention to the one form of embodiment herein disclosed, for it is susceptible of embodiment in various forms all coming within the scope of claims which follow.

What is claimed is—

1. In a cash register, the combination with a driving member and an operating mechanism for giving said member movement in one direction only, of a member driven by said driving member, separable connections between said members, means for securing differential extents of movement of said driven member, a register or counter, and an operating device for said register or counter connected to the driven member.

2. In a cash register, the combination with an operating mechanism, including a driving member and a driven member, of means for connecting the two members so that the driven member will have a forward movement only, a counter, a counter operating device and means for connecting and disconnecting the driven member and counter operating device.

3. In a cash register, the combination with a driving member and a driven member, both of which have forward movements only, of means for coupling the two members together, a series of keys for controlling said means, a counter and a counter operating device connected to the driven member.

4. In a cash register, the combination with a driving disk, of a driven gear, a stationary disk, latches mounted on the driven gear for coupling the same to the driving disk and arranged to be controlled by the stationary disk, a series of keys for controlling said latches, and a counter and connections arranged to be operated by the driven gear.

5. In a cash register, the combination with a counter operating mechanism including a segmental rack, means for moving the rack out of engagement with the counter to permit of an independent movement of the latter, and transfer devices comprising an oscillatory plate and a toothed slide mounted on said plate and arranged to be set for operation by the counter.

6. In a cash register, the combination with an operating mechanism including a segmental rack, of a movable frame, a counter mounted in said movable frame arranged to be moved thereby into engagement with the rack, means for moving the rack out of engagement with the counter, and transfer devices adapted to be operated after the rack is moved out of such engagement.

7. In a cash register, the combination with a driving member, of a driven member, arranged to be moved in a forward direction only, means for coupling the two members, a counter, a counter operating device and movable means connected to the counter operating device and arranged to be thrown into and out of connection with the driven member so as to follow only a part of the movement of the same.

8. In a cash register, the combination with a driving member, of a driven member, formed with a series of slots, means for connecting the two members, a counter, a counter operating device and means connected to the latter and arranged to be thrown into and out of the slots of the driven member so as to follow only a part of the movement of the same.

9. In a cash register, the combination with a driving member, of a driven gear, latches for coupling the two together, a series of keys for controlling said latches, a counter, a counter operating device and a movable means connecting the latter to the driven gear and arranged to be thrown into and out of connection therewith.

10. In a cash register, the combination with a driving member, of a driven gear having a forward movement only and formed with a series of of slots, of a series of latches for connecting the driving member and gear, a series of keys for controlling said latches, a counter, a counter operating device and a movable arm connected to the latter and carrying a projection so located that it may be thrown into and out of the slots of the driven gear.

11. In a cash register, the combination with an operating rack segment, of a counter mounted in a movable frame, means for moving the counter into engagement with the rack, means for moving the rack out of engagement with the counter, and transfer devices.

12. In a cash register, the combination with a driving member, of a driven member, latches for connecting said members, a series of keys for controlling said latches, a stationary disk for successively disengaging the latches from the driving member, and a counter and connections controlled by the driven member.

13. In a cash register, the combination with a driving member, of a driven member carrying a series of latches and movable only in a forward direction, a series of keys movable into a coöperating plane into which the latches are successively brought, and a device for locking the latch to be used in the normal position, means mounted on the driving member for tripping said latch, and a counter and connections operated by the driven member.

14. In a cash register, the combination with a driving member, of a driven member formed with a series of slots, a counter, a counter operating device, and a pivoted arm mounted on the latter and carrying a pin which is arranged to be projected into or withdrawn from the slots in the driven member.

15. In a cash register, the combination with a driving member, of a driven member, latches for coupling the two members, a series of keys for controlling the latches, a movable device common to all of the keys, a latch lever arranged to arrest one of the aforesaid latches and adapted to be operated by the common key member.

16. In a cash register, the combination with a driving member, of a driven member, latches mounted on the driven member for connecting the same to the driving member, a series of keys for controlling said latches, a latch lever arranged to engage any one of said coupling latches and controlled by the keys, and a latch controlled by the driving member and also arranged to engage any one of the coupling latches.

17. In a cash register, the combination with a rock shaft, of a series of eccentrics mounted on said shaft, a series of operating racks mounted on said eccentrics, a counter mounted in a movable frame and means for moving the counter into engagement with the racks, the construction being such that the movement of the rock shaft will withdraw the racks out of engagement with the counter.

18. In a cash register, the combination with a rotary driving member, having a forward movement only, of a rotary driven member also only movable in a forward direction, a series of latches mounted on the driven member and arranged when released to engage the driving member, a series of keys adapted when operated to be engaged by said latches, to force the latter out of engagement with the driving member, and a counter and connections coöperating with the driven member.

19. In a cash register, the combination with a driven member carrying a series of independent latches and having a forward movement only, of a driving member constructed to permit the operation of only one of the latches at a time, a series of keys for controlling the latches, and a counter and connections controlled by the driven member.

20. In a cash register, the combination with a driving member of a driven member, carrying a series of latches for connecting the same to the driving member, a latch lever for arresting said latches in normal position, a series of keys for arresting the latches in different positions, a detent for the keys, and a reciprocating device arranged to be set by the detent for operating the latch lever, and a counter and connections controlled by the driven member.

21. In a cash register, the combination with a driving member, of a driven member, carrying a series of spaced latches, any one of which is arranged to couple said driven member to the driving member, a series of keys for controlling any one of said latches that is brought into a certain operative plane, means for holding all of the latches except one out of the operative plane a counter and connections controlled by the driven member.

22. In a cash register, the combination with a rotary driving member, movable in a forward direction only, of a rotary driven member movable in a similar manner, a series of coupling latches mounted on the driven member and any one of which can couple said member to the driving member, a series of keys for operating any one of said latches which is brought into a certain operative plane, a latch lever for arresting the coupling latches in normal position, means for operating the latch lever controlled by the keys, and a counter and connections controlled by the driven member.

23. In a cash register, the combination with a driving member, formed with an operative shoulder, of a driven gear, carrying a series of coupling independently movable latches any one of which may be brought into coöperative relation with said shoulder, a series of keys for controlling said latches, and a counter and connections controlled by the driven gear.

24. In a cash register, the combination with an operating mechanism including a series of oscillatory rack segments, a series of transfer segments, and a series of resetting segments, of a counter arranged to be moved into engagement with the rack segments, transfer devices carried by the transfer segments, and resetting devices mounted on the resetting segments and arranged to engage the transfer devices to reset them.

25. In a cash register, the combination with an operating mechanism including a series of counter operating elements, a series of oscillatory transfer elements, and a series of oscillatory resetting elements, of a counter arranged to be moved into connection with the operating elements, transfer slides mounted on the transfer elements and resetting projections mounted on the resetting elements and arranged to reset the transfer slides.

26. In a cash register, the combination with an operating mechanism, of a counter, an oscillatory segment, transfer slides mounted on the segment, latches for said slides, operated by the counter, means for oscillating said segment, and devices for returning the transfer slides to normal position after they have been set.

27. In a cash register, the combination with a counter, of an operating mechanism, a movable member carrying transfer slides, latches for said slides and a movable member carrying devices for arresting the slides after they are released and subsequently releasing the same to permit them to move to operative positions.

28. In a cash register, the combination with a counter, of an operating mechanism, a movable member carrying a series of transfer slides, latches for said slides, an independently movable member carrying slide engaging projections, and means connecting this latter member to the operating mechanism whereby it is first moved to arrest the transfer slides, then to release the same, and finally to reset said slides to normal positions.

29. In a cash register the combination with a driving member, of a driven member, a stationary member, a series of independently movable latches for connecting the driving and driven members, and a counter and connections controlled by the driven member, the construction being such that the driven member is first moved forward to a normal zero position and then given an additional movement to effect the registration.

30. In a cash register, the combination with a driving member, of a driven member, carrying a series of independently movable latches any one of which may coöperate with the driving member, a series of keys for controlling said latches and an indicator geared to the driven member.

31. In a cash register, the combination with a driving member, of a driven member arranged to be moved forward only, means for coupling the two members together, a counter operating element, a pivoted arm mounted on said element and arranged to be thrown into and out of connection with the driven member, means connected to the moving parts of the machine and arranged to throw said lever out of connection with the driven member and thereafter return it to its normal position, and a counter coöperating with the counter operating element.

32. In a cash register, the combination with a driving member, of a driven member having a forward movement only, means for coupling the two members together, a counter, a counter operating element, a pivoted arm mounted on the latter and arranged to be engaged with and disengaged from the driven member, and means for moving said arm upon its pivot to disengage it from the driven member.

33. In a cash register, the combination with a rotary driving member having a forward movement only, of a rotary driven member also having only a forward movement, means for coupling the two members together, a counter, a counter operating element, a pivoted arm mounted on said element and arranged to be engaged with and disengaged from the driven member, and means for first moving the arm on its pivot to disengage it from the driven member and subsequently moving the same to return the counter operating element to its normal position.

34. In a cash register, the combination with a driving member, of a driven member having a forward movement only, means for coupling the two members together, a counter, a counter operating segment, an arm or lever hinged to said segment and arranged to be moved into and out of engagement with the driven member, and a cam device arranged to engage said lever and first disengage it from the driven member and then operate it to return the counter driving element to its normal position.

35. In a cash register the combination with a series of counting elements, of a movable member, a transfer slide mounted on said member so as to wipe by one of the counting elements when the member is operated, a latch for holding the slide in its retracted position, and means connected with one of the counting elements for tripping the latch.

36. In a cash register the combination with a series of counting elements, of an oscillating carrier, a transfer slide mounted on said carrier, a latch for securing the slide in inoperative position in relation to the counting elements, and means operated by one of the counting elements for tripping the latch.

37. In a cash register, the combination with a driving member, of a driven member, latches mounted on the driven member for coupling the same to the driving member and comprising pivoted latches proper, and pivoted pawls mounted on said latches, a series of keys arranged to contact with said pawls and thereby operate the latches, and a counter and connections coöperating with the driven member.

38. In a cash register, the combination with a driving member, of a driven member carrying a series of latches, means for normally holding all of the latches, excepting one, out of operative position, a latch device for holding the excepted latch out of operative position, a series of keys arranged to control this latch device, and a counter and connections coöperating with the driven member.

39. In a cash register, the combination with a driving member, of a driven gear formed with a series of slots, means for coupling the two members together, a series of keys for controlling the coupling means, a counter, a counter operating rack segment, an arm pivoted on said segment and carrying a projection, and means for moving said arm to force the projection out of engagement with the walls of one of the slots of the driven member.

40. In a cash register, the combination with a driving member, of a driven gear formed with a series of radial slots, means for coupling the members together, a counter, a counter operating rack, an arm hinged on said rack and formed with a pin, a spring for operating said arm to cause the pin to enter the slots in the driven gear, and means for moving said arm to disengage its pin from the walls of said slots.

41. In a cash register, the combination with a driving means, of a driven gear having a forward movement only, a rotary indicator, gearing connecting said indicator permanently to the driven gear, a counter, and a counter operating rack and connections which are alternately engaged and disengaged from the driven gear.

42. In a cash register, the combination with a driving member, of a driven gear having a forward movement only, a rotary indicator, gearing connecting said indicator permanently to the driven gear, a type carrier, gearing connecting said carrier permanently to the driven gear, a counter, and a counter operating rack and connections arranged to be alternately engaged and disengaged from the driven gear.

43. In a cash register, the combination with an operating mechanism including a counter engaging rack, of a counter arranged to be moved into engagement therewith, means for moving said rack out of engagement with the counter, a movable member carrying a toothed transfer slide, a latch for said slide arranged to be operated by the counter, and means for moving the transfer carrying member to cause the tooth of the transfer slide to operate the counter.

44. In a cash register, the combination with a series of keys, of a driving member, a driven member carrying a series of latches for coupling it to the driving member, two latches for engaging the coupling latch that is in operative position, one of said latches being controlled by the keys and the other by the driving member, and a counter and connections controlled by the driven member.

45. In a cash register, the combination with a series of keys, of a driving member, a driven member, a series of latches carried by this latter member for coupling the same to the driving member, a stationary member for holding all of said latches, excepting one, out of operative position, and two latches for the coupling latch which is in operative position, one of these latches being controlled by the keys, and the other by the driving member.

46. In a cash register, the combination with a series of keys, of a driving member, a driven member carrying a series of latches for coupling the same to the driving member, movable operating devices mounted on said latches and arranged to be actuated by the driving member and thereby moved into a position to coöperate with an operated key, and a counter and connections controlled by the driven member.

47. In a cash register, the combination with a series of keys, of a driving member, a driven member, a series of latches on the driven member and arranged to couple the same to the driving member, a stationary member for holding all of the latches, excepting one, out of operative position, movable operating devices mounted on the respective latches, means mounted on the driving member for setting the latch operating device of the latch which is in operative position, and a counter and connections controlled by the driven member.

48. In a cash register, the combination with an operating mechanism including a rack segment, of a counter mounted in a movable frame and arranged to be moved into connection with said segment, a segment carrying a transfer slide, a latch for said slide arranged to be operated by the counter when the same is in operative position, a resetting segment, mechanism for oscillating the transfer slide segment and the resetting segment after the operation of the rack segment, and means for moving the rack segment out of connection with the counter while the latter is still in operative position.

49. In a cash register, the combination with an operating mechanism including a rack segment, of a counter mounted in a movable frame and arranged to be brought into connection with said segment, means for moving the segment away from the counter while the latter is still in operative position, an oscillatory segment carrying a transfer slide, a latch for normally holding the slide in operative position and adapted to be tripped by the counter, and an oscillatory segment carrying means for resetting the transfer slide.

50. In a cash register, the combination with an operating mechanism including a rack segment, of a counter mounted in a movable frame and arranged to be brought into connection with the rack segment, a transfer device, a latch for said device controlled by the counter, and a movable member and means for moving the same into the path of the transfer device, the construction being such that when said transfer device is released, it is caught and held by said movable member and subsequently released therefrom, and finally reset thereby.

51. In a cash register, the combination with a series of keys, of an operating mechanism including a rotary handle and a latch for said handle controlled by the keys, and comprising a latch lever, a spring pressed notched disk engaging the same, and means connecting the notched disk, and handle adapted to allow a certain free, independent movement of said disk.

52. In a cash register, the combination with an operating mechanism including a rotary shaft, and an oscillatory rack segment, of a counter mounted in a movable frame and arranged to be brought into connection with the rack segment, an eccentric supporting the rack segment, means connecting the rotary shaft to the eccentric for operating the same, to withdraw the rack segment from engagement with the counter, and transfer devices for the counter.

53. In a cash register, the combination with an operating mechanism, of a series of independent counters, mounted in movable frames, arms connected to said frames and carrying operating projections, a series of keys for operating said arms, an oscillatory segment having cam slots arranged to receive the said projections, and means connecting the oscillatory segment with the movable parts of the machine.

54. In a cash register, the combination with an operating mechanism, of a series of independent counters mounted in movable frames, rigid arms mounted on the respective frames and carrying anti-friction rollers, springs for turning said arms to normal positions, an oscillatory segment having cam slots, a series of keys for moving the counter frames to bring the anti-friction rollers into coöperative relation with said cam slots, and means connected to the movable parts of the machine for oscillating said segment.

55. In a cash register, the combination with a counter mounted in a movable frame, of a counter operating element, means for moving said frame to carry said counter into and out of engagement with said element, and means for moving said element to carry the same into and out of engagement with said counter.

56. In a cash register the combination with a series of counting elements, counter actuating devices therefor, and means for effecting an engagement between said actuating devices and said counting elements, of a movable member carrying transfer slides, latches for securing the slides in their inoperative positions, means for tripping the latches, and an independent operating device for retracting and relatching the slides.

57. In a cash register the combination with a series of counting elements, counter actuating devices therefor, and means for effecting an engagement between said actuating devices and said counting elements, of an oscillating segment, transfer slides mounted on the segment, latches for securing the slides in position and arranged to be tripped by the counting elements, and means for oscillating the segment after the latches are tripped to a degree sufficient to move a counting element an additional degree.

58. In a cash register the combination with a series of counting elements, counter actuating devices therefor, and means for effecting an engagement between said actuating devices and said counting elements, of a movable member carrying transfer slides, latches for said slides, means for tripping the latches, and a movable member carrying cam flanges for returning and relatching the slides.

59. In a cash register the combination with a series of counting elements, counter actuating devices therefor, and means for effecting an engagement between said actuating devices and said counting elements, of a movable member carrying transfer devices, latches for said devices coöperating with the counting elements, and a movable member carrying cam devices for returning the transfer devices to their normal positions.

60. In a cash register the combination with an operating mechanism, of a series of independent counters coöperating therewith and having operating projections, an oscillatory member formed with cam slots into which said projections extend, whereby the counters are moved positively into and out of coöperative relation with the operating mechanism.

61. In a cash register the combination with a driving member having a continuous forward movement, of a driven member, a latch for the driven member, means connected to the driving member for operating the latch, and controlling devices for the driven member arranged to set the latch-operating device for operation in connection with the latch.

62. In a cash register the combination with a driving member, of a driven member, means for limiting the movement of the driven member, an operating rack, a counter coöperating with the rack, and a pivoted member connected to the rack and arranged to be thrown into and out of engagement with the driven member.

63. In a cash register, the combination with a series of registering elements, of a movable member carrying a series of transfer devices, means for tripping the transfer devices, and means for bringing the transfer devices and registering elements together.

64. In a cash register the combination with an operating mechanism having a continuous and graduated forward movement, of a counter, a counter operating device, and means for intermittently connecting and disconnecting the operating mechanism and counter operating device.

65. In a cash register the combination with an operating mechanism having a continuous and graduated forward movement a counter, a rack operating the counter, and means for intermittently connecting the rack and operating mechanism.

66. In a cash register the combination with an operating mechanism having a continuous and graduated forward movement, of a counter mounted in a movable frame, a counter operating rack with which the counter is brought into engagement, and means for intermittently connecting the operating mechanism and rack.

67. In a cash register, the combination with a counter, of a pivoted frame supporting said counter, means for rocking said frame, counter operating racks, and means for moving said racks into and out of mesh with the counter.

68. In a cash register the combination with a main actuator, of an operating mechanism having a continuous and graduated forward movement, a counter, counter operating devices, and means intermediate the counter operating devices and the main operating mechanism for intermittently connecting and disconnecting the same, and also returning the counter operating devices to normal position when disconnected.

69. The combination with suitable counting devices, of a rotary driving member, a rotary driven member arranged to turn in one direction only and having a circular series of independently movable latches any one of which is adapted to connect it with the driving member, and a set of keys for differentially determining the points at which a connected latch shall be moved and disconnected from the driving member.

70. In a cash register, the combination with a driving member and means for giving same forward movement only, of a revoluble and differentially movable driven member having a plurality of zero positions in the course of one complete revolution.

71. In a cash register, the combination with a driving member, of a driven member, means for connecting said driven member to said driving member to impart to the driven member differential movement in a forward direction only, and means for disconnecting said driven member from said driving member at a fixed point in the movement thereof.

72. In a cash register, the combination with a driven member and means for giving the same a movement in a forward direction only, of a counter, a reciprocatory counter actuating device, means for coupling said counter actuating device to said driven member to impart to the former differential movement in one direction, and means for restoring said counter actuating device to normal position independently of said driven member.

73. In a cash register, the combination with a counter, of an operating rack therefor, a support for said rack including an eccentrically mounted disk, and means for shifting said eccentrically mounted disk to carry said rack into and out of engagement with said counter.

74. In a cash register, the combination with a counter mounted in a pivoted frame, a series of operating racks for said counter, means for rocking said frame to connect the counter and racks, and means for moving the racks out of mesh with the counter.

75. In a cash register, the combination with a plurality of accounting devices, of operating racks common to said devices, means for moving any desired counter into position to be operated by the racks, and means for moving said racks away from the counter which has been moved.

76. In a cash register, the combination with a plurality of counters, mounted in separate pivoted frames, operating devices common to said counters, means for rocking any desired counter frame, and means for moving the operating devices away from said counters.

77. In a cash register, the combination with accounting devices, of operating devices therefor, eccentrically mounted disks, on which said devices are carried, and means for rocking said disks to carry said operating devices out of position to operate the accounting devices.

78. In a cash register, the combination with a plurality of counters, of operating racks common thereto, eccentric bearings for said racks, and means for rocking the bearings to withdraw the racks from the counters.

79. In a cash register, the combination with a counter, of operating devices therefor, eccentric bearings on which said operating devices are mounted, and means for simultaneously rocking the eccentric bearings to carry the operating devices out of position to control the counter.

80. In a cash register, the combination with an accounting device, and operating devices therefor, of means for engaging and disengaging said accounting and operating devices, transfer slides spring pressed in one direction, latches holding said slides but adapted to be disengaged therefrom by the accounting device, means for operating said slides when the latches have been tripped, and cam devices for first restraining said slides, then releasing them and finally resetting them to normal position.

81. In a cash register, the combination with accounting devices, and operating devices therefor, of manipulative devices for predetermining the movement of the accounting devices, rocking segments, spring-pressed transfer teeth mounted on said segments for radial sliding movement, trip latches for said transfer teeth adapted to be operated by said accounting devices, and cam devices for releasing and thereafter resetting the transfer teeth.

82. In a cash register, the combination with a plurality of counters, of operating racks for the same, frames separately supporting said counters, keys for rocking any desired counter frame, means for bodily moving the racks to carry them out of gear with the counters, transfer devices, and means for operating them before the counter is returned to normal position.

83. In a cash register, the combination with an operating mechanism, of a plurality of counters, racks controlling movement of the counters, frames in which the counters are separately mounted, keys for moving the frames, and a plate having cam slots the edges of which engage and move farther the operated counter frame to bring said counter into mesh with the operating racks.

84. In a cash register, the combination with an operating mechanism, of a counter and racks for controlling the said counter, a pivoted frame in which said counter is mounted, a key for rocking said frame, and means for further rocking said frame to move the counter into operative relation to the racks.

85. In a cash register, the combination with an operating mechanism, and means normally locking same, keys for disabling the lock and means for retaining the locking device disabled, comprising a disk having a lost motion connection to said operating mechanism, and a spring for moving said disk.

86. In a cash register, the combination with a driving device having a constant excursion at each operation of the machine, a driven device, accounting and indicating devices controlled by said driven device, means operated by the driving device for carrying the driven device to a zero position at each operation, a latch for said driven device adapted to retain said device when its zero position is reached, and a series of keys for controlling the latch.

In testimony whereof we affix our signatures, in the presence of two witnesses.

JOSEPH P. CLEAL.
ALVAN MACAULEY.

Witnesses:
  JOHN A. WERNER,
  WM. H. MUZZY.